(12) United States Patent
Lewin et al.

(10) Patent No.: US 11,724,434 B2
(45) Date of Patent: Aug. 15, 2023

(54) TEMPERATURE CONTROL DEVICE AND CONTAINER PRODUCTION MACHINE

(71) Applicant: KHS GmbH, Dortmund (DE)

(72) Inventors: Frank Lewin, Tangstedt (DE); Deniz Ulutürk, Hamburg (DE); Arne-Fritz Wiese, Ahrensburg (DE); Dieter Klatt, Hamburg (DE); Christian Mündel, Ammersbek (DE); Daniel Firchau, Schmilau (DE); Karl-Heinz Balkau, Oststeinbek (DE)

(73) Assignee: KHS GmbH, Dortmund (DE)

( * ) Notice: Subject to any disclaimer, the term of this patent is extended or adjusted under 35 U.S.C. 154(b) by 234 days.

(21) Appl. No.: 17/299,770

(22) PCT Filed: Dec. 6, 2019

(86) PCT No.: PCT/EP2019/084012
§ 371 (c)(1),
(2) Date: Jan. 17, 2022

(87) PCT Pub. No.: WO2020/115290
PCT Pub. Date: Jun. 11, 2020

(65) Prior Publication Data
US 2022/0134631 A1      May 5, 2022

(30) Foreign Application Priority Data
Dec. 7, 2018   (DE) ...................... 10 2018 131 464.7

(51) Int. Cl.
| B29C 49/64 | (2006.01) |
| B29C 49/42 | (2006.01) |
| B29C 49/28 | (2006.01) |
| B29C 49/46 | (2006.01) |
| B29K 67/00 | (2006.01) |
| B29L 31/00 | (2006.01) |

(52) U.S. Cl.
CPC .......... B29C 49/6418 (2013.01); B29C 49/28 (2013.01); B29C 49/4205 (2013.01);
(Continued)

(58) Field of Classification Search
CPC ............ B29C 49/6418; B29C 49/6427; B29C 49/6435; B29C 49/6458; B29C 49/645;
(Continued)

(56) References Cited

U.S. PATENT DOCUMENTS 5,876,768 A * 3/1999 Collombin .............. B29C 49/68
425/534
5,980,229 A * 11/1999 Collombin .............. B29C 49/68
425/534
(Continued)

FOREIGN PATENT DOCUMENTS

DE      102016005273 A1      11/2017
DE      102016007850 A1      1/2018
(Continued)

OTHER PUBLICATIONS

Machine translation of DE 10 2016 005 273 A1 dated Nov. 2017. (Year: 2017).*
(Continued)

Primary Examiner — Robert B Davis
(74) Attorney, Agent, or Firm — Rankin, Hill & Clark LLP

(57) ABSTRACT

A temperature adjustment device (2) for thermally conditioning preforms (10) made of a thermoplastic material for subsequent molding including a transport device based on the rotary principle for transporting the preforms along a transport path that has at least one section with two adjacent transport lanes (32, 34) for transporting the preforms in two adjacent rows. Heating elements (36) are arranged between the transport lanes for heating the preforms. Each heating element acts on preforms in both transport lanes. At least one compensation device (22, 22', 23, 24) for compensating for temperature differences between the preforms is assigned to the two transport lanes, which exclusively or more strongly acts on preforms in one of the two transport lanes for adjusting their temperature. Also, a container manufacturing machine (1) for manufacturing containers (12) from preforms that includes a temperature adjustment device.

16 Claims, 8 Drawing Sheets

Figure 1:
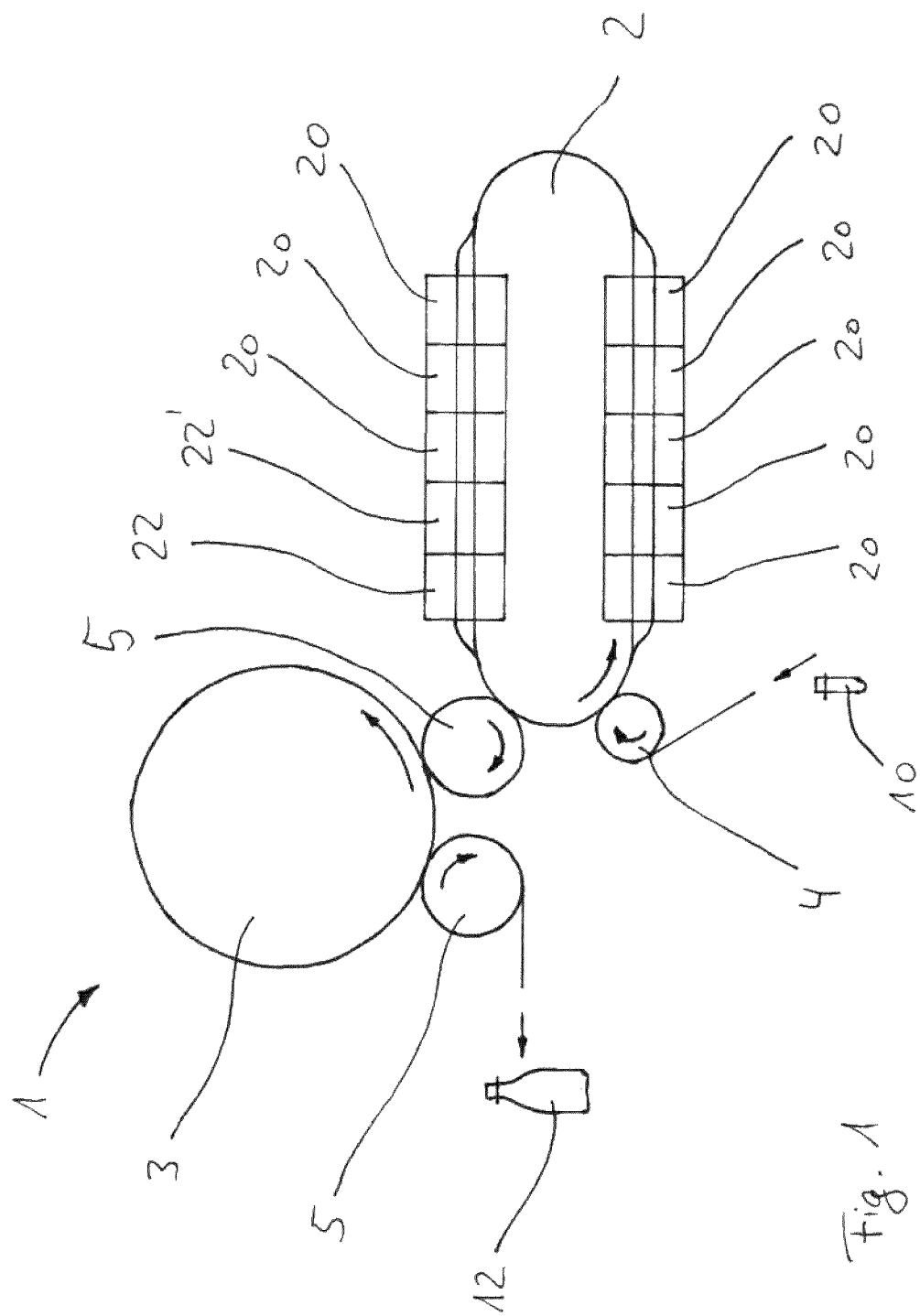

(52) U.S. Cl.
CPC ...... *B29C 49/46* (2013.01); *B29C 2049/4664* (2013.01); *B29K 2067/003* (2013.01); *B29L 2031/712* (2013.01)

(58) Field of Classification Search
CPC .......... B29C 49/6436; B29C 49/42095; B29C 49/42065; B29C 49/42119; B29C 49/42101
See application file for complete search history.

(56) References Cited

U.S. PATENT DOCUMENTS

| | | |
|---|---|---|
| 2007/0224307 A1 | 9/2007 | Zoppas et al. |
| 2016/0368197 A1 | 12/2016 | Takahashi et al. |
| 2018/0029283 A1 | 2/2018 | Baumgarte et al. |
| 2019/0134878 A1 | 5/2019 | Meyer et al. |

FOREIGN PATENT DOCUMENTS

| | | | |
|---|---|---|---|
| DE | 102016113875 A1 | 2/2018 | |
| WO | WO-0134369 A1 * | 5/2001 | ......... B29C 49/6409 |

OTHER PUBLICATIONS

International Search Report dated Mar. 13, 2020 filed in PCT/EP2019/084012.

\* cited by examiner

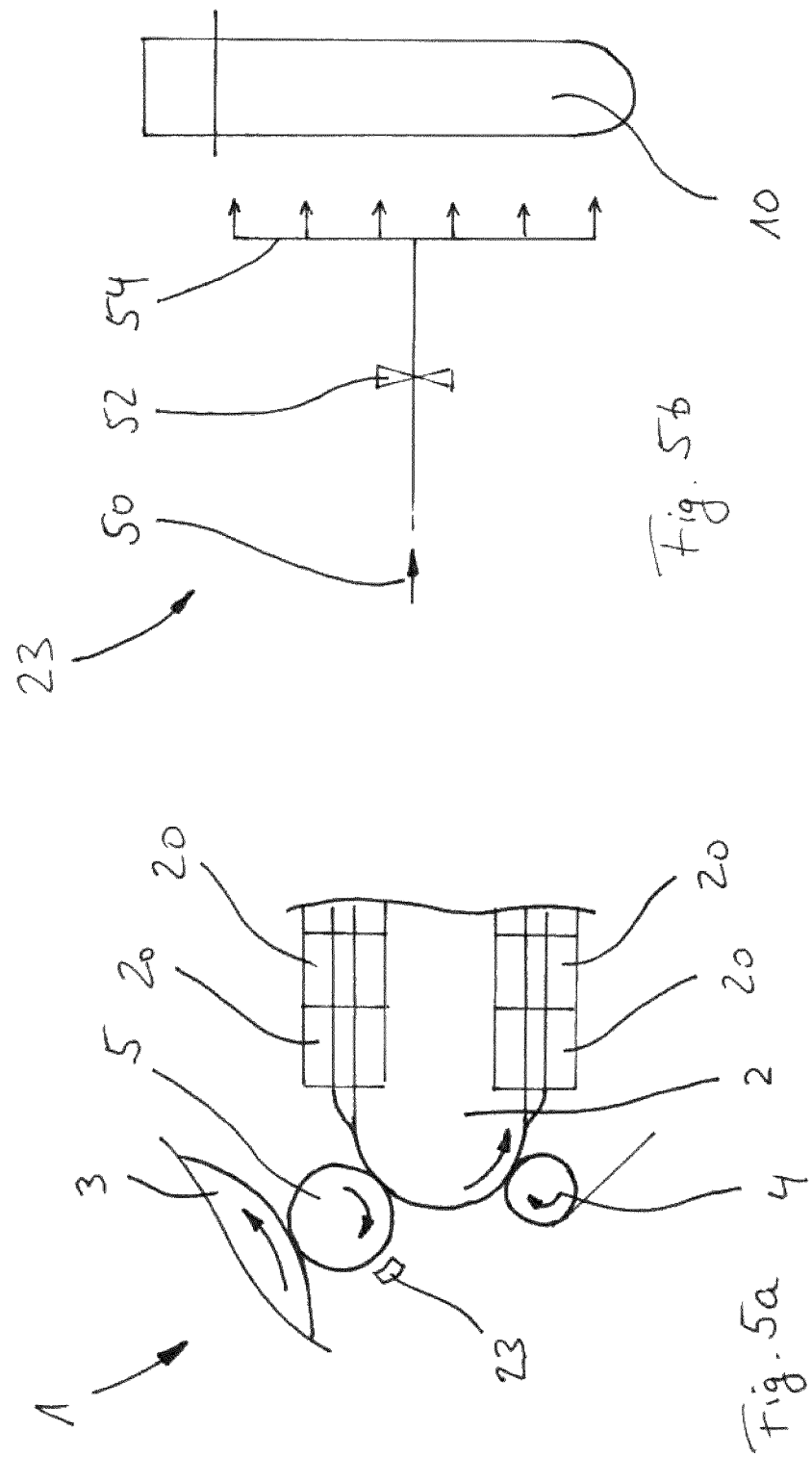

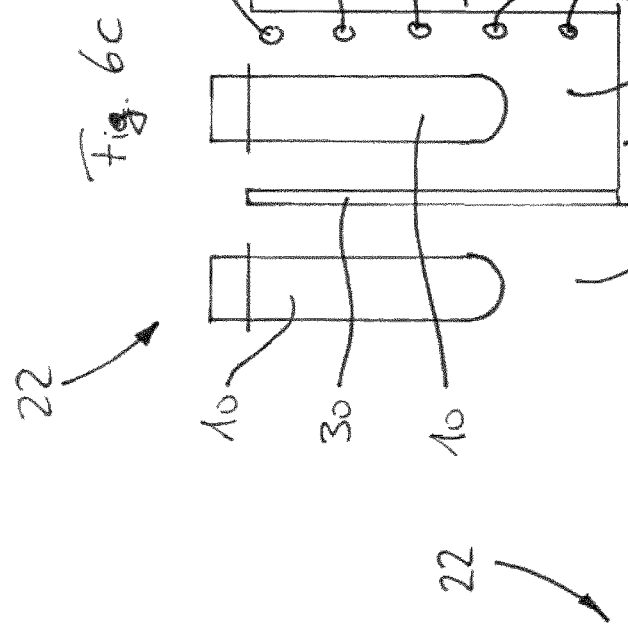
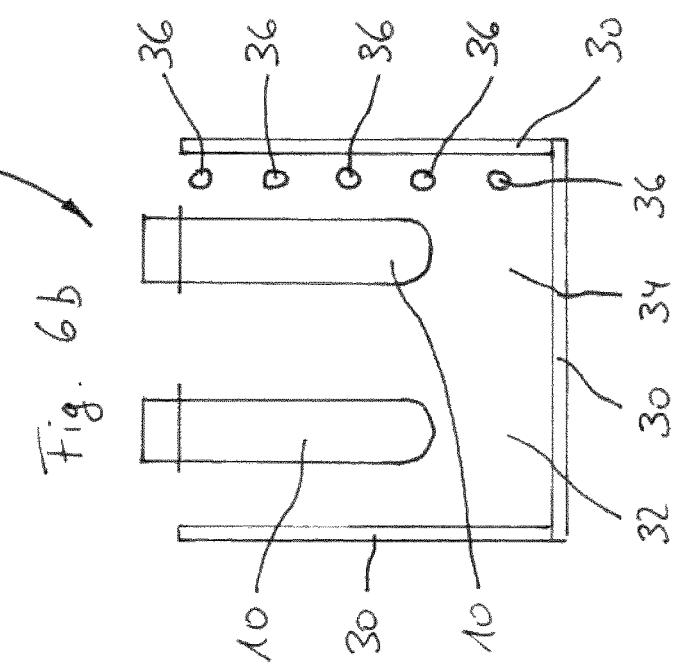
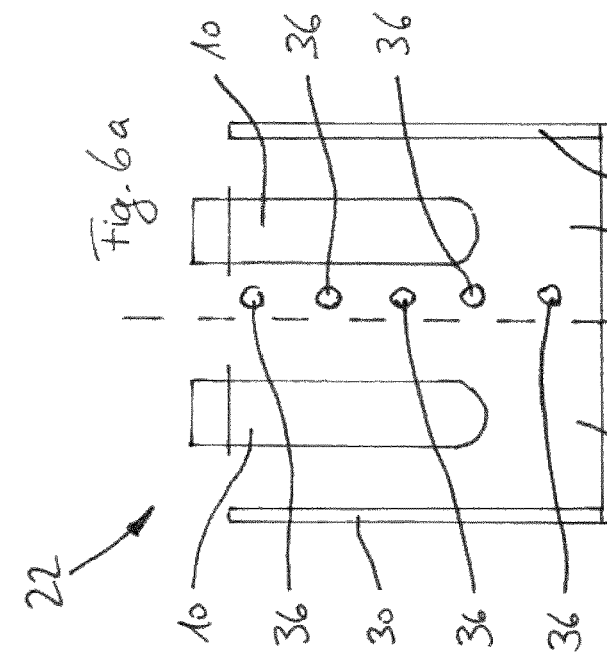
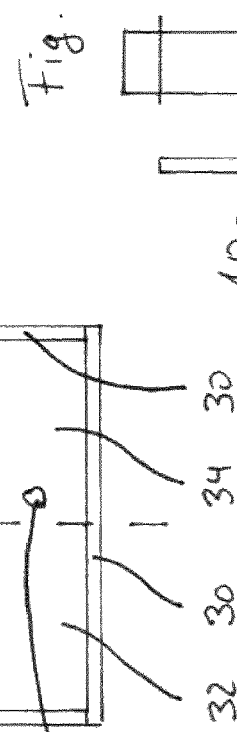

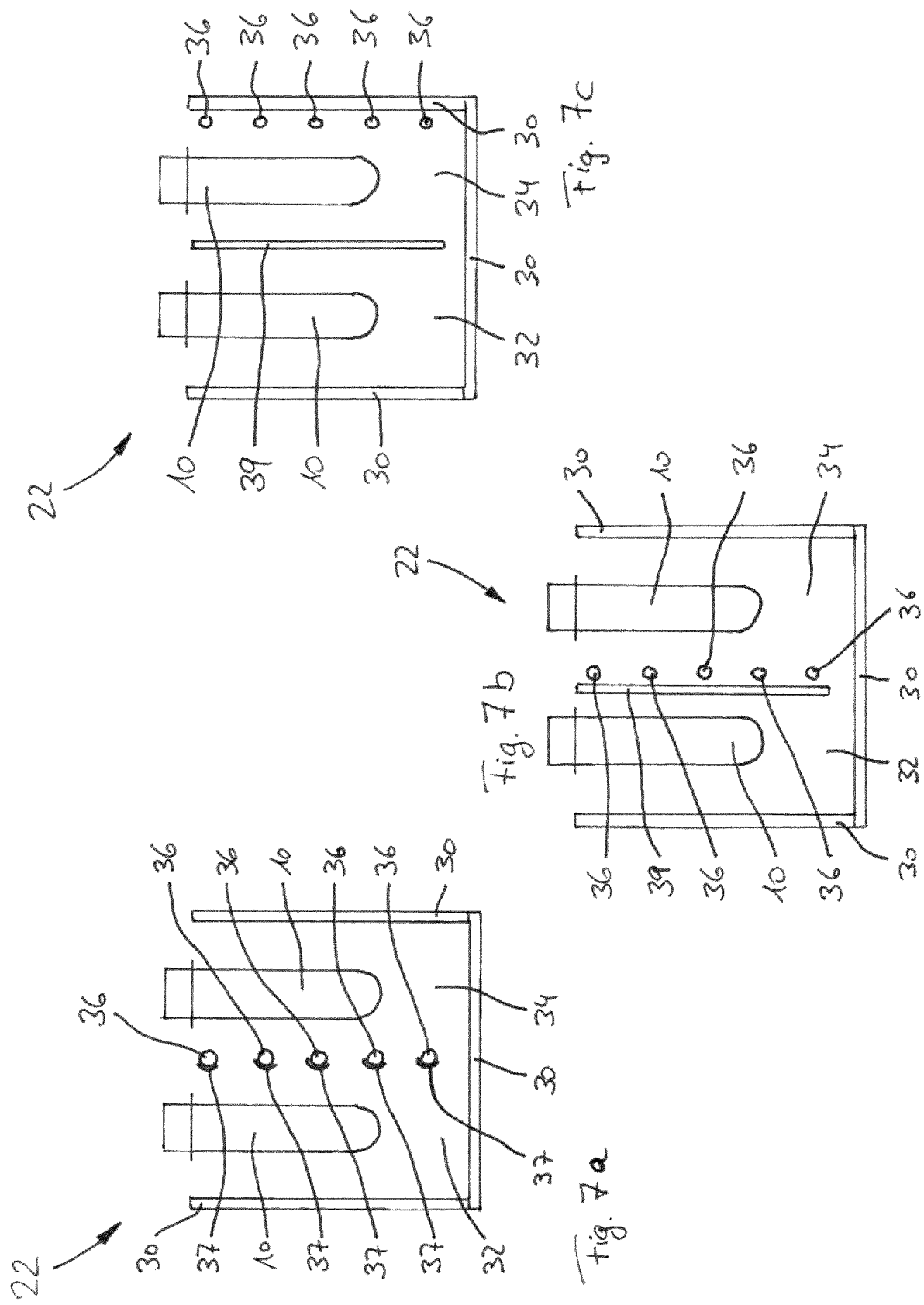

TEMPERATURE CONTROL DEVICE AND CONTAINER PRODUCTION MACHINE

The invention relates to a temperature adjustment device for the thermal conditioning of preforms made of a thermoplastic material for subsequent molding, comprising a transport device based on the rotary principle for transporting the preforms along a transport path, the transport path having at least one section with two adjacent transport lanes for transporting the preforms in two adjacent rows, so that each preform can be assigned to one of the two transport lanes, the temperature adjustment device further comprising heating elements arranged between the transport lanes for heating the preforms, the heating elements being arranged between the transport lanes in such a way that each heating element acts on preforms in both transport lanes.

The invention further relates to a container manufacturing machine for manufacturing containers from preforms comprising a temperature adjustment device for thermal conditioning of preforms made of a thermoplastic material and a molding device for molding the thermally conditioned preforms into containers.

Conventional heaters are widespread, in which the preforms are transported in a single-row continuous stream through a heating tunnel in which the preforms are heated by means of radiant heaters arranged at the side. All preforms run through the same transport path, which automatically ensures that the heating or thermal conditioning is carried out in the same way for all preforms.

In contrast, the invention relates to a type of novel heating systems in which the preforms are transported in two transport lanes on both sides of the radiant heaters. A generic temperature adjustment device is described, for example, in DE 10 2016 005 273 A1. Suitable transport devices are described, for example, in DE 10 2016 007 850 A1 or DE 10 2016 113 875 A1.

Also with these generic temperature adjustment devices with two transport lanes arranged next to one another, the aim is to ensure that all preforms are thermally treated in the same way. Even with a symmetrical construction of the two transport lanes, however, it has been shown that even small disturbances, for example one-sided contamination of reflector components or slight deviations in the alignment of the components of the temperature adjustment device to one another, can cause thermal unequal treatment of the preforms in the two transport lanes.

Therefore, it is an object of the present invention to ensure, with as little effort as possible, that the preforms are thermally conditioned as uniformly as possible despite being transported through different transport lanes.

According to the invention, this object is achieved by a temperature adjustment device for the thermal conditioning of preforms made of a thermoplastic material for subsequent molding, comprising a transport device based on the rotary principle for transporting the preforms along a transport path, the transport path having at least one section with two adjacent transport lanes for transporting the preforms in two adjacent rows, so that each preform can be assigned to one of the two transport lanes, the temperature adjustment device further comprising heating elements arranged between the transport lanes for heating the preforms, the heating elements being arranged between the transport lanes in such a way that each heating element acts on preforms in both transport lanes, wherein the temperature adjustment device according to the invention is characterized in at that the temperature adjustment device has least one compensation device to compensate for temperature differences between the preforms assigned to the two transport lanes, which exclusively or more strongly acts on preforms associated to one of the two transport lanes for adjusting their temperature.

Such temperature adjustment devices are generic in which the heating elements act on the preforms in both transport lanes. In contrast, temperature adjustment devices in which heating elements are assigned to only one of the two transport lanes are not of the generic type.

The invention enables in particular to compensate for inconsistent thermal conditioning of the preforms assigned to the respective transport lanes by means of the compensation device. This eliminates the need to ensure strict equal treatment of the preforms in the two transport lanes, which could otherwise only be achieved, monitored and permanently ensured with considerable effort.

The heating elements are preferably radiant heaters, for example infrared radiators or IR radiators or near-infrared radiators or NIR radiators. This enables economical and energy-efficient heating of the preforms. According to the invention, it is provided in particular that the radiant heaters radiate into both transport lanes so that the corresponding sections of the two transport lanes form a uniform radiation space in which the preforms are heated by the action of radiation. In this case, radiant heaters arranged one above the other in one plane allow the preforms to be provided with a temperature profile adapted to the respective subsequent molding process.

The rotary principle of the transport device, which is according to the invention, is characterized in particular by the fact that the preforms are conveyed or transported in a continuous stream by transport systems rotating at constant speed, the preforms being transferred between successive transport systems in the transport direction. Suitable transport systems include, for example, closed conveyor chains, wheels or rotating telescopic arms. The transport systems each carry holding elements for the preforms, for example grippers or transport mandrels.

The rotary principle differs fundamentally from a likewise known cyclical conveying, in which the preforms are conveyed step by step by means of conveyors moving alternately forward and backward and are generally conveyed in a straight line.

The section with two adjacent transport lanes is arranged, for example, between an input area for single-row input of the preforms into the transport device and an output area for single-row output of the preforms from the transport device. At the transition between single-row and double-row transport, the preforms are for example, depending on the configuration of the transport device, distributed alternately between the two adjacent transport lanes and are alternately brought together again to form a single row at the end of the double-row transport section. The individual holding elements of the transport device are, for example, each converted from an elongated configuration to a compact configuration and vice versa.

In the context of the invention, each preform runs through either one of the two transport lanes or the other along the transport path. Each of the preforms can thus be assigned to one of the two transport lanes, regardless of whether it is currently in the relevant transport lane, has already passed through or is still being passed through.

According to the invention, the two transport lanes are passed in particular in the same transport direction. This is not opposed to the fact that there can be several sections with two lanes, the transport lanes of one section also may be passed in the opposite direction than the transport lanes of the other section.

In the context of the invention, temperature adjustment is understood in particular to approximate a desired temperature and/or temperature distribution, which, depending on the starting temperature, can conceptually include both heating as well as heating and cooling.

It is advantageously provided that the compensation device is separately adjustable and/or controllable and/or closed loop controllable in its temperature adjustment performance. In this context, separate means in particular that the temperature adjustment performance of the compensation device and the temperature adjustment performance of the other temperature adjustment of preforms can be changed independently of one another. This adjustability also advantageously enables an adaptation to differences in temperature adjustment that change over time.

If the compensation device can also be controlled in its temperature adjustment performance, an adaptation to variable differences in temperature adjustment can in particular also be implemented without interrupting operation.

It is particularly advantageous if the compensation device can be closed loop controlled in its temperature adjustment performance. This way, adaptation to variable or changing differences in temperature adjustment can take place automatically.

An advantageous embodiment of the invention is characterized in that the compensation device comprises supply means for a cooling agent for cooling at least the preforms assigned to one of the two transport lanes, the supply means having a flow path with at least one outlet facing the preforms for subjecting the preforms to the cooling agent. This embodiment of the invention in particular allows for a simple structural and control implementation of the invention, air or compressed air being preferably used as the cooling agent.

The cooling capacity can be easily adjusted, for example, if the outlet has a variable cross section. In the case of a large-scale outlet, this can, for example, be achieved structurally very simple by means of two perforated plates that can be displaced against one another.

It is conceivable, for example, to arrange the outlet next to one of the two transport lanes. A different temperature-adjusting effect on the preforms in the two transport lanes is ensured by the fact that the cooling agent reaches the preforms in the two transport lanes one after the other and has thus already lost part of its cooling capacity when reaching the transport lane further away from the outlet. In this case, air is preferably used as the cooling agent, the air being conveyed into the flow path, for example, by a fan, and the cooling output being very easily adjustable by appropriate control of the fan.

The differences in the thermal adjustment effect can be further increased if the compensation device has a separation device in the area of the outlet arranged between the transport lanes for shielding the cooling agent from the other transport lane.

It is also conceivable within the scope of the invention that the supply means comprise a valve in the flow path which can be synchronized with the transport device in order to subject each preform transported past the outlet to the cooling agent depending on the transport lane it is assigned to. In this context, it is conceivable that the outlet is designed as a nozzle or nozzle arrangement, which is arranged, for example, in transport direction behind the two transport lanes, i.e. in a section in which all preforms are transported or conveyed in one row one after the other. In this case, the cooling agent can be, for example, compressed air, with only those preforms being subjected to one or more compressed air blasts by means of the synchronizable valve which have passed through one of the two transport lanes. This embodiment is particularly advantageous when there is insufficient space for a compensation device available in the section with two transport lanes.

Another preferred embodiment of the invention is characterized in that the compensation device comprises heating elements. This enables reheating those preforms that are too cold. This way, the doubled energy effort for cooling preforms which previously have been over-heated becomes obsolete.

A different temperature-adjusting effect on the preforms of the two transport lanes is achieved, for example, in that the heating elements of the compensation device are arranged at a different distance from the preforms in the two transport lanes, respectively. Since in common heating elements, for example conventional halogen radiators, the power density decreases with the distance from the radiator, the preforms in the closer lane are heated more strongly than the preforms in the more distant lane. In the context of the invention, it is provided that heating elements are arranged between the two transport lanes offset towards one of the lanes or alternatively on the outside next to one of the transport lanes.

Additionally or alternatively, it is conceivable that the heating elements of the compensation device are at least partially shielded in the direction of one of the two transport lanes.

This can be realized, for example, by means of a shielding coating on the heating elements, which is preferred for heating elements that are arranged between the two transport lanes due to the small space requirement. It is also conceivable to provide a shielding device which is arranged between the heating elements and the transport lane to be shielded. When the heating elements are arranged on the outside next to one of the transport lanes, the shielding device is provided, for example, between the transport lanes.

The shielding device is, for example, a broadband filter which reduces the intensity of the filtered radiation from the heating elements. In the context of the invention, however, it is also conceivable that only a specific frequency component of the radiation spectrum is shielded from heating elements with a selective filter. It is known from quartz glass, for example, that long-wave radiation components are retained.

Within the scope of the invention, a shielding device can also be designed as a complete separation. In this case, a reflector is a particularly advantageous embodiment because heating of the shielding device is reduced by at least partial reflection of the incident heating power.

In addition to the actively cooling or actively heating embodiments of a compensation device according to the invention described above, it is also conceivable within the scope of the invention that compensation device is another transport device for the preforms assigned to one of the two transport lanes only, so that the transport path for these preforms is lengthened compared to the preforms assigned to the other transport lane. During this lengthened transport path, the preforms cool down already due to the, compared to the heated preforms, lower ambient temperature.

Different embodiments of compensation devices according to the invention can generally be combined as desired. Therefore, within the scope of the invention, a plurality of compensation devices with different temperature-adjusting effects can also be provided, which exclusively or predominantly affect temperature of all preforms in the same transport lane. For example, both a heating and a cooling compensation device can be present for one of the transport lanes. For the other transport lane, a compensation device is no longer necessary, which is advantageous if, due to the design, there is less installation space available for compensation devices in one of the transport lanes than in the other transport lane.

A particularly preferred embodiment of the invention is characterized in that the temperature adjustment device has two compensation devices, of which one compensation device exclusively or more strongly acts on preforms associated to one of the two transport lanes for adjusting their temperature and of which the other compensation device exclusively or more strongly acts on preforms associated to the other transport lane. This enables the advantageous use of the invention even if it is not certain from the outset which of the two transport lanes leads to the relatively warmer or relatively colder preforms. It is particularly advantageous if the two compensation devices can be individually adjusted in terms of their temperature adjustment performance.

The object of the invention is further achieved by a container manufacturing machine for manufacturing containers from preforms comprising a temperature adjustment device according to the invention for thermal conditioning of preforms made of a thermoplastic material and a molding device for molding the thermally conditioned preforms into containers. The molding device can be, for example, a blow molding device for shaping by means of a pressurized gas. In the context of the invention, however, it is also conceivable that the molding device is for molding by means of a liquid filling substance to remain in the containers.

Figure 2:
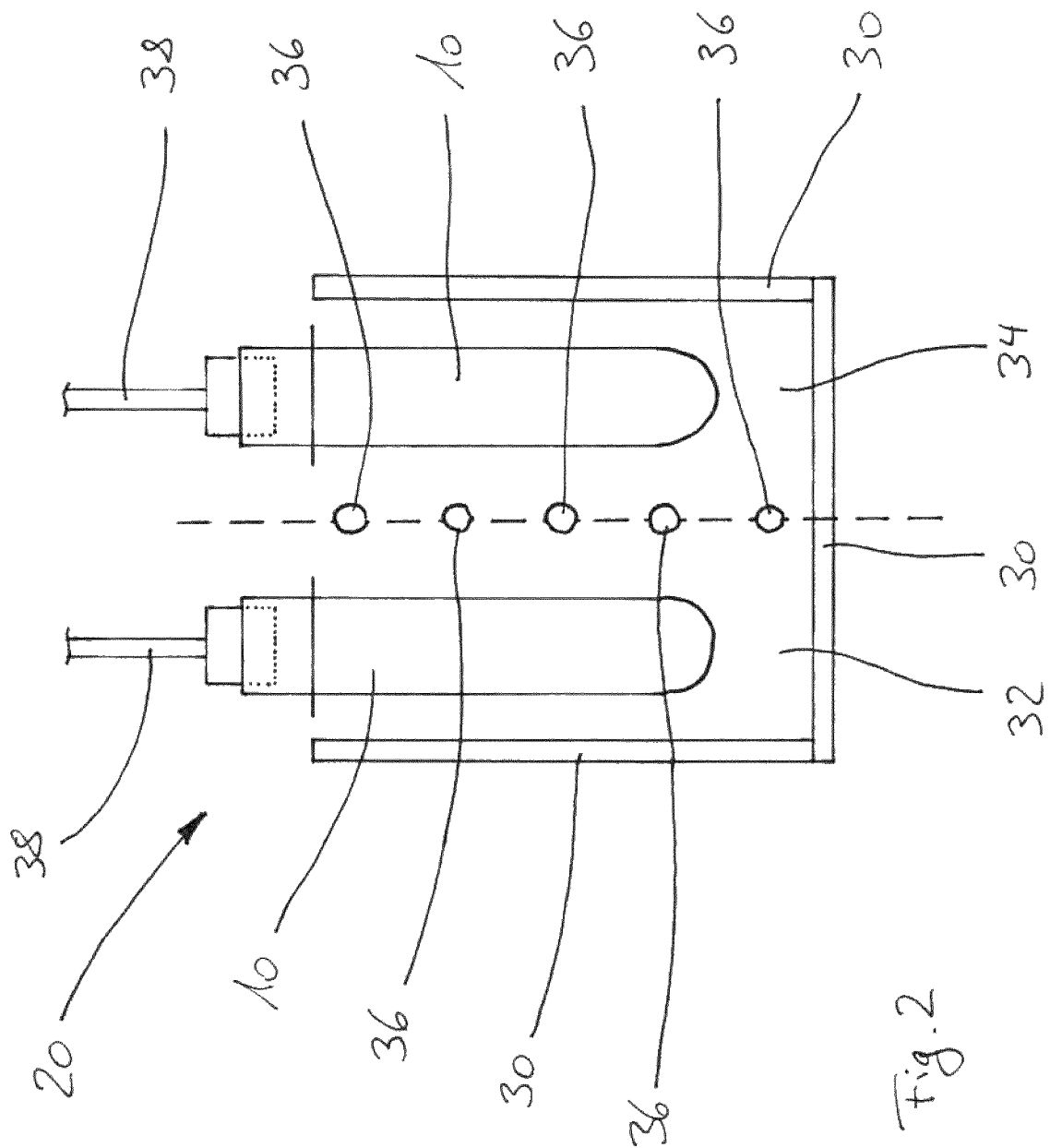
Figure 3B:
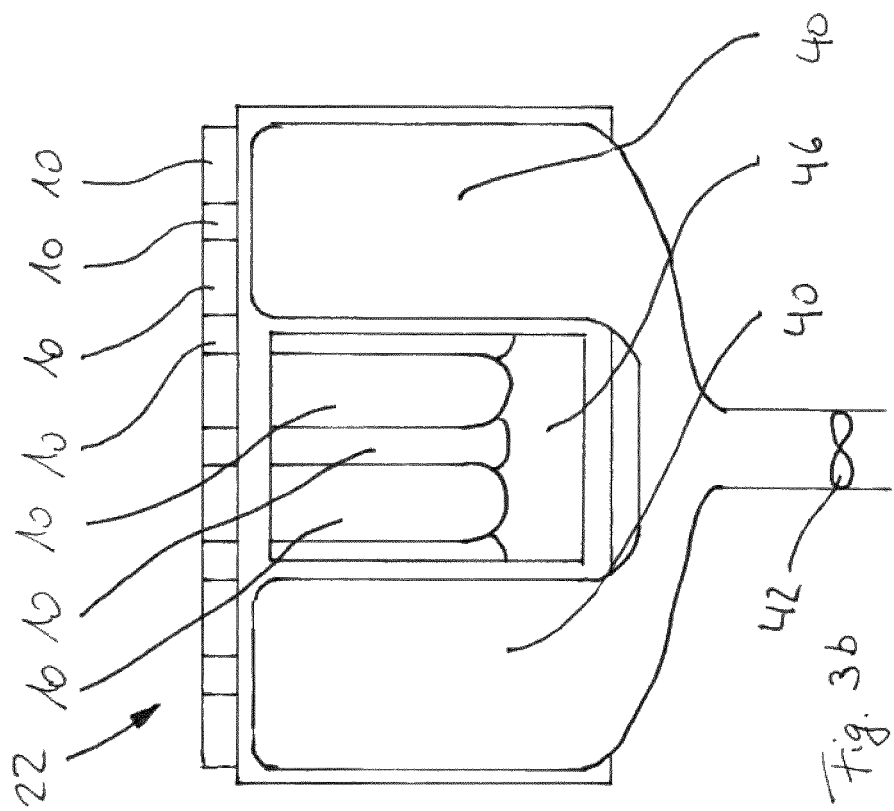
Figure 3A:
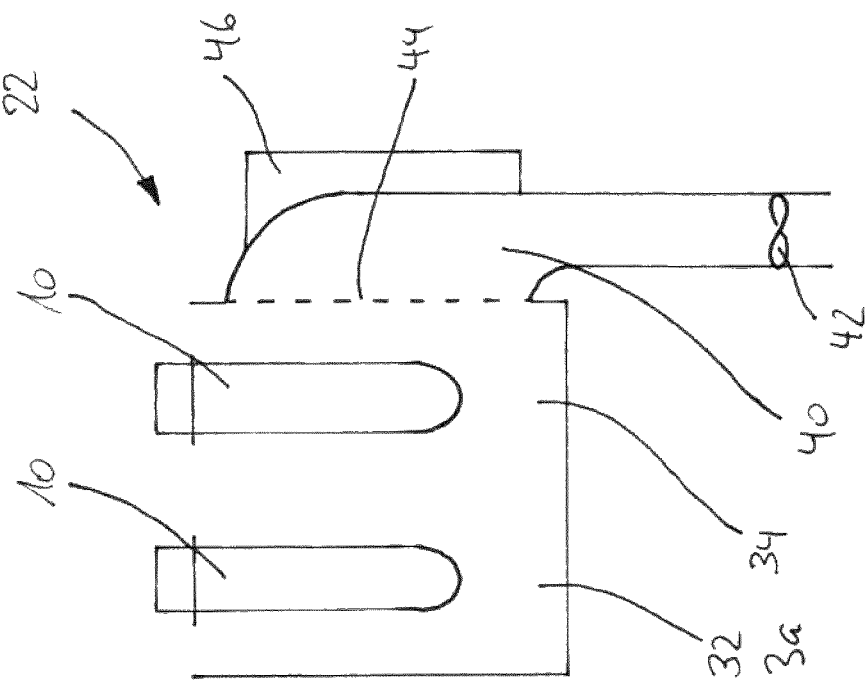
Figure 4B:
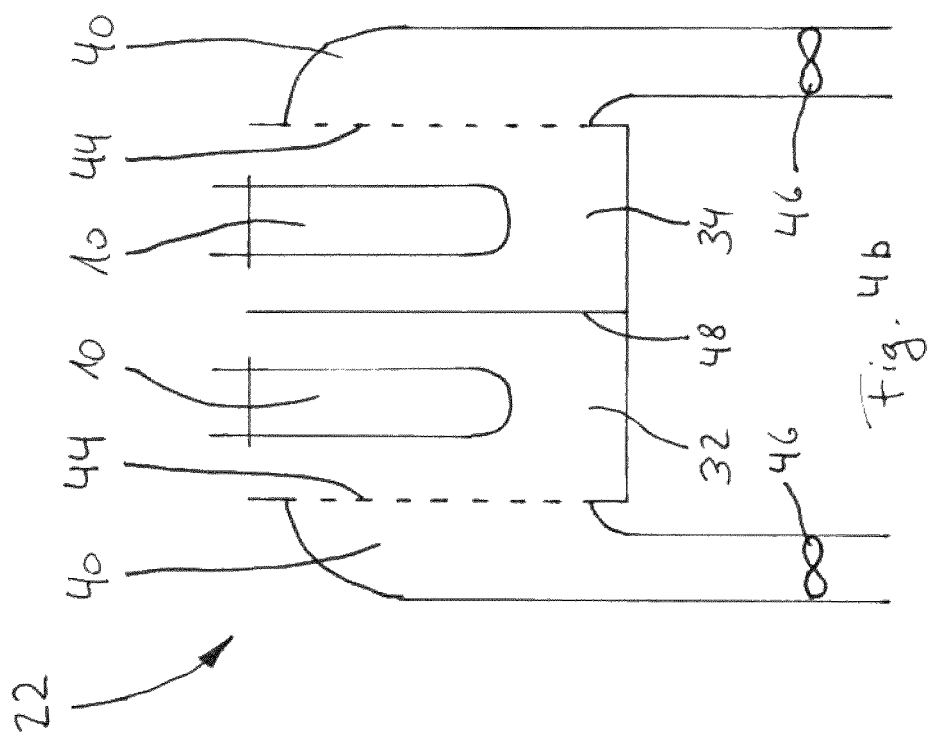
Figure 4A:
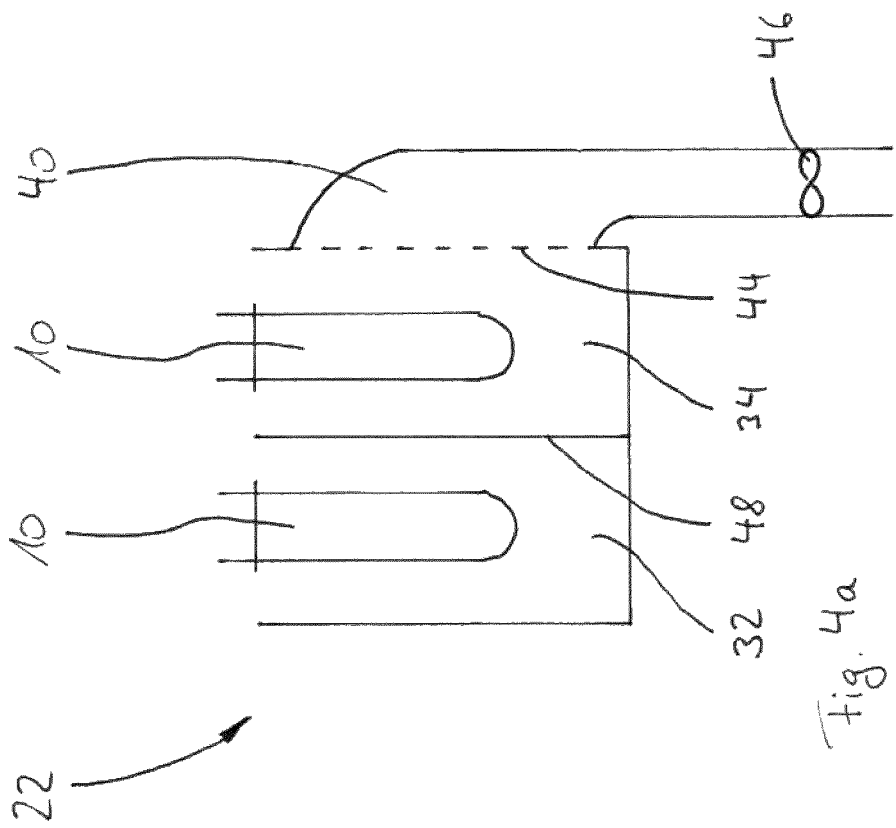
Figure 8B:
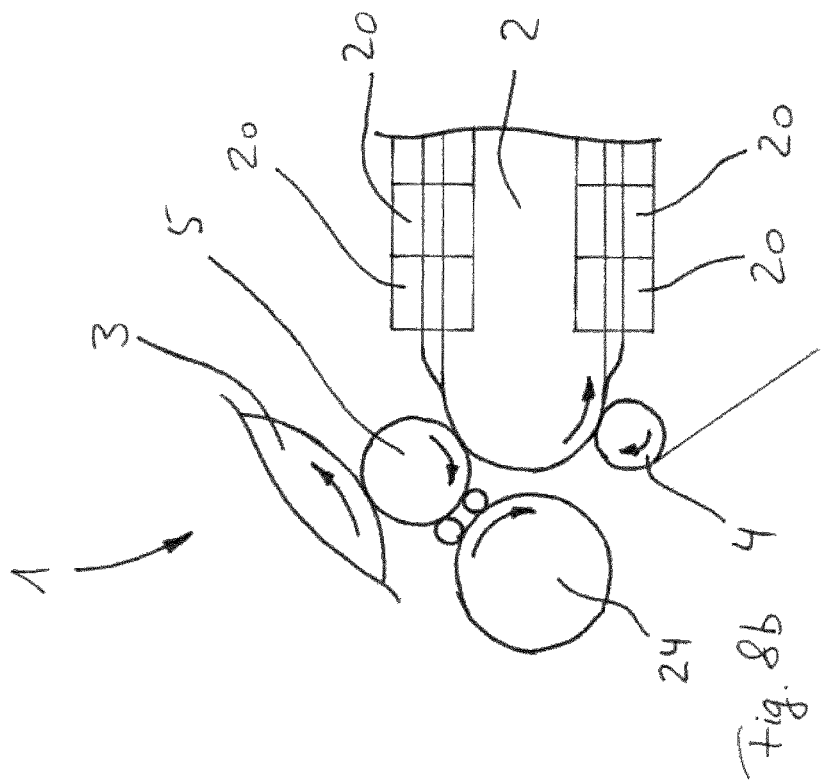
Figure 8A:
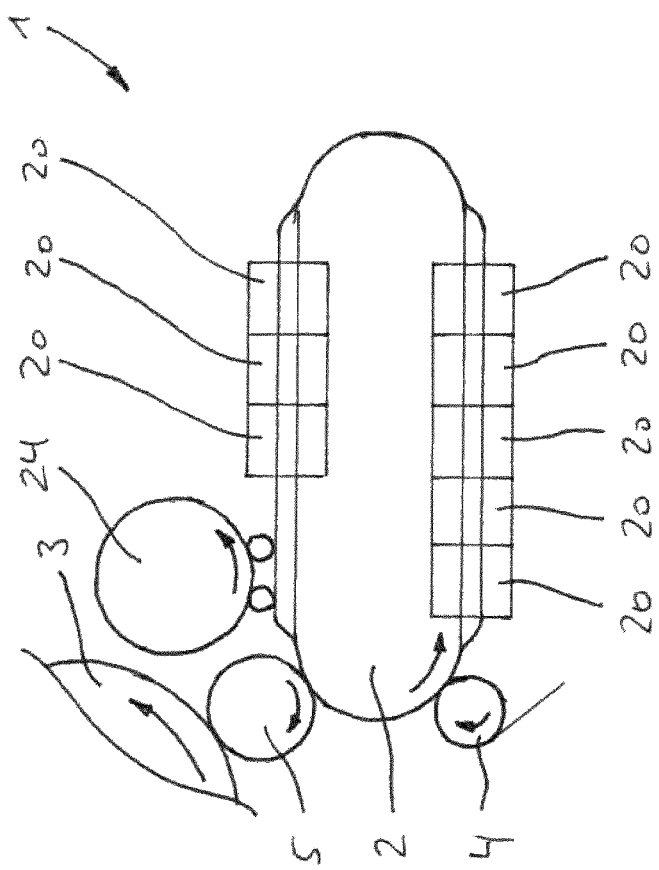

The invention is described below in more detail with reference to exemplary embodiments according to the invention, which are shown in the drawings. It is shown in:

FIG. 1 schematically an exemplary embodiment of a container manufacturing device according to the invention;

FIG. 2 schematically a cross section through a heating section of a temperature adjustment device according to the invention;

FIG. 3a schematically a cross section through an exemplary embodiment of a compensation device of a temperature adjustment device according to the invention;

FIG. 3b a side view of the compensating device in FIG. 3a;

FIG. 4a a cross section of a further exemplary embodiment of a compensation device according to the invention;

FIG. 4b a cross section of a further exemplary embodiment of a compensation device according to the invention;

FIG. 5a schematically a section of an exemplary embodiment of a container manufacturing machine according to the invention;

FIG. 5b schematically a more detailed representation of the compensation device in FIG. 5a;

FIG. 6a a cross section of a further exemplary embodiment of a compensation device according to the invention FIG. 6b a cross section of a further exemplary embodiment of a compensation device according to the invention FIG. 6c a cross section of a further exemplary embodiment of a compensation device according to the invention FIG. 7a a cross section of a further embodiment of a compensation device according to the invention;

FIG. 7b a cross section of a further embodiment of a compensation device according to the invention;

FIG. 7c a cross section of a further embodiment of a compensation device according to the invention;

FIG. 8a schematically a further exemplary embodiment of a container manufacturing machine according to the invention with a passive compensation device; and FIG. 8b schematically a further exemplary embodiment of a container manufacturing machine according to the invention with a passive compensation device.

In the drawings, elements and/or parts that are the same or of the same type are provided with the same reference numbers, so that repeated introduction can be omitted when appropriate.

FIG. 1 shows an exemplary container manufacturing machine 1 according to the invention. The exemplary container manufacturing machine 1 is constructed according to the rotary principle and has several stations 2, 3, 4, 5 with circulating transport systems, the direction of rotation of which is indicated by arrows. Preforms 10 are fed into the container manufacturing machine 1, are transported through the container manufacturing machine 1 in continuous stream by means of which transport systems and are processed in several successive processing steps into containers 12, which are finally output from the container manufacturing machine 1. The preforms 10 or the containers 12, respectively, are transferred from one transport system to the next along the transport path.

The preforms 10 first arrive at an input station 4, where they are aligned into a continuous, preferably uninterrupted, transport stream.

The preforms 10 are then transferred, in a continuous stream, to a temperature adjustment device 2, by means of which the preforms 10 are thermally conditioned for subsequent molding into containers 12. The transport system of the temperature adjustment device 2 is designed in such a way that the continuous stream of preforms 10 is split along two straight sections in which the respective temperature adjustment treatment takes place, so that in these sections the preforms 10 are transported in two parallel rows. A plurality of heating devices 20 for heating the preforms 10 are provided along these double-row sections.

Further provided are two compensation devices 22, 22', which also have a temperature-adjusting effect, i.e. heating or cooling, on the preforms 10. The compensation devices 20, 22, 22' are designed in such a way that they cool or heat the preforms of one of the two rows to a greater extent than the preforms 10 of the other row. The compensating devices 22, 22' are coordinated with one another in such a way that they each prefer a different one of the two rows of preforms 10. For this purpose, the compensation devices 22, 22' are, for example, constructed in a mirror image of one another in terms of their essential active components.

By separately controlling the two compensation devices 22, 22', it is possible to compensate for any temperature differences that may exist between the two rows of preforms 10 after they have passed the heating devices 20. This ensures that all preforms 10, regardless of which of the two rows they passed through the temperature adjustment device 2, have a uniform temperature control, i.e. for example a uniform temperature and/or a uniform temperature profile.

From the temperature adjustment device 2, the preforms 10 are transferred in a single-row continuous stream by means of a transfer station 5 to a molding device 30, by means of which the preforms 10 are molded into containers 12. In the context of the invention, both blow molding by means of compressed air and form-fill molding by means of a liquid filling substance under pressure, which then remains in the molded container, are conceivable. The finished containers 12 are then output by means of a further transfer station 5 and are fed to any further treatment, for example filling, sealing and/or labeling.

FIG. 2 shows a cross section through one of the heating devices 20 in a simplified representation. The heating device 20 has a radiation space delimited by reflectors 30, in which two transport lanes 32, 34 are provided for one of the parallel rows of preforms 10 each as already described. The preforms 10 are held suspended in the temperature adjustment device 2 by means of transport mandrels 38 of the transport system, with a homogeneous temperature control in the circumferential direction being ensured by rotating the transport mandrel 38.

The preforms 10 are heated by means of infrared radiators 36, which extend along the transport direction of the preforms 10 and are arranged in the central plane, shown as a dashed line, between the transport lanes 32, 34. A profiling of the preform temperature along the longitudinal axis of the preforms 10 can be achieved by means of suitable power control of the infrared radiators 36 lying one above the other. The infrared radiators 36 are arranged in such a way that each infrared radiator 36 acts on preforms 10 in both transport lanes 32, 34.

The heating device can have other elements customary in the industry, for example cooling for the mouths of the preforms 10, or screens and reflectors moving along, which limit the radiation space at the top. Such elements are not shown in FIG. 2 for reasons of simplicity.

A first exemplary embodiment for a compensation device 22 according to the invention is shown in FIGS. 3a and 3b. It is provided that the preforms 10 are subjected to a flow of cooling air in order to dissipate any excess thermal energy.

To introduce the cooling air, a flow channel 40 is provided which opens laterally next to one of the transport lanes 34. For example, a perforated plate 44 is provided at the outlet in order to generate a uniform, planar air flow. It is also conceivable to construct the perforated plate 44 from two plates that can be displaced relative to one another in order to be able to adjust the flow cross-section from flow channel 40 into transport lane 34.

Furthermore, a fan 42 is provided in the flow channel 40 in order to ensure a controlled flow of cooling air. A large exhaust opening 46 is provided next to the outlet of the flow channel 40 in order to prevent the cooling air from accumulating in the transport lanes 34, 32 or from being distributed in an uncontrolled manner along the transport direction of the preforms 10.

As a result of the lateral arrangement of the flow channel 40 next to the transport lane 34, the preforms 10 in the transport lane 34 are initially exposed to the cooling air flow. The preforms 10 in the transport lane 32, on the contrary, are shaded on the one hand by the preforms 10 in the transport lane 34 and on the other hand are subjected to cooling air that has already been heated by the preforms 10 in the transport lane 34. The cooling effect of the cooling agent is therefore much stronger on the preforms 10 in the transport lane 34 than on the preforms 10 in the transport lane 32.

If, as shown in FIG. 4a, a partition 48 is further provided between the transport lanes 32, 34, the asymmetrical effect is maximized, for the cooling air flow no longer reaches the preforms 10 in the transport lane 32 and only the preforms 10 in the transport lane 34 are cooled.

If it is known that the preforms 10 in the same transport lane 32 or 34 are always warmer than in the other transport lane 34 or 32 and have to be cooled accordingly to compensate for the temperature difference, then a single compensation device 22 according to the exemplary embodiments shown in FIG. 3a, 3b or 4a is sufficient. If, with different settings, sometimes the preforms 10 of one lane 32, 34 and sometimes of the other transport lane 34, 32 are the warmer ones, compensation can be achieved, for example, in that two compensation devices 22, 22' are provided as shown in FIG. 1. The compensation device 22' can be constructed according to the same principle as the exemplary embodiments shown in FIG. 3a, 3b or 4a, the flow channel for the compensation devices 22' being arranged next to the transport lane 32 shown on the left.

However, it is also possible to minimize the space requirement and to cool the preforms 10 in both transport lanes 32, 34 independently of one another. An exemplary embodiment of a compensation device 22 according to the invention which is suitable for this is shown in FIG. 4b. Here, the transport lanes 32, 34 are again flow-wise separated from one another by means of a partition wall 48, each of the transport lanes 32, 34 having a separate cooling air supply with a flow channel 40 and fan 42 and an optional perforated plate 44, wherein the flow of cooling agent on both sides can be adjusted independently of one another by means of the fan 42 and/or the perforated plates 44 in the manner described above.

Container manufacturing machines 1, in particular those with blow molding, usually have a compressed air supply by means of a compressor. In the context of the invention, it is therefore also conceivable to use this available compressed air to compensate for temperature differences. An exemplary embodiment for a corresponding compensation device 23 according to the invention is shown in FIG. 5b. Compressed air from a compressed air supply 50 is directed via a nozzle arrangement 54 directly onto a preform 10, which is conveyed past the nozzle arrangement 54. An upstream valve 52 enables, for example, pressure blasts of different duration and thus different cooling capacities to be set, but also enables synchronization with the conveyance of the preforms 10. It is therefore also possible to place the compensation device 22 shown in FIG. 5b where all preforms 10 are transported in a single row, instead of next to one of the transport lanes 32, 34, with only those preforms 10 being subjected to compressed air by means of the valve that previously have passed through one of the two transport lanes 32 or 34. FIG. 5a shows an exemplary arrangement of the compensation device 23 at the transfer station 5 between the temperature adjustment device 2 and the molding device 3, the compensating device 23 being assigned to the temperature adjustment or to the temperature adjustment device 2 in terms of function and control technology, regardless of its arrangement.

The temperature compensation by selective cooling as described in the previously discussed embodiments of the invention is very simple to implement in terms of design and control and thus enables an inexpensive and effective implementation of the invention. In operation, however, it is less energy-efficient, since excess energy is initially introduced into the preform 10 and is later cooled again with further expenditure of energy. From an energetic point of view, it is therefore more favorable, to add to the preform 10 the missing energy or heat for the desired temperature adjustment during the temperature compensation as described. Different embodiments for a corresponding compensation device 22 according to the invention are shown in FIGS. 6a, 6b and 6c as well as 7a, 7b and 7c.

In the exemplary embodiment shown in FIG. 6a, the essential components of the compensation device 22 correspond to the heating device 20 shown in FIG. 2. However, in the compensation device 22, in contrast to the heating device 20, the radiant heaters 36 are not arranged centrally between the preforms 10 of the two transport lanes 32, 34, but rather displaced towards one of the two transport lanes 34. As a result of the smaller distance, the radiation power of the infrared radiators 36 impinging on the preforms 10 in the transport lane 34 is higher than the radiation power impinging on the preforms 10 in the transport lane 32.

Within the scope of the invention, it is also conceivable to use exclusively compensation devices 22 according to the exemplary embodiment of FIG. 6a instead of heating devices 20 for the whole heating path of the container manufacturing device 1 shown in FIG. 1. Based on the offset direction, the compensation devices 22 then form one group each, the two groups preferably being controlled independently of one another.

An alternative embodiment of a compensation device 22 with asymmetrical heating is shown in FIG. 6b. Here, the infrared radiators 36 are not arranged between the two transport lane 32, 34, but rather on the outer side of the transport lane 34. The concept of different heating by different distance and thus different radiation power is retained like in the example shown in FIG. 6a, wherein the difference in the distances between the preforms in the transport lanes 32, 34 and the infrared radiators 36, respectively, and thus also the difference in the respective incident radiation powers is significantly greater than in the exemplary embodiment in FIG. 6a.

As shown in FIG. 6c, this asymmetry can be maximized by arranging a reflector 30 between the transport lanes 32, 34 so that all radiation from the infrared radiators 36 remains limited to preforms 10 in the transport lane 34, while the preforms 10 in the transport lane 32 are not heated at all.

In the area of the compensating device 22 it is therefore conceivable within the scope of the invention that the two transport lanes 32, 34 form a uniform radiation space, see the embodiments of FIGS. 6a and 6b, or separate radiation spaces or that, as shown in FIG. 6c, only one of the two transport lanes 32, 34 leads through a radiation space.

Another embodiment of a compensation device according to the invention is shown in FIG. 7a. This embodiment is also based in principle on the design of a heating device 20 described in FIG. 2. However, in the compensation device 22 in FIG. 7a, infrared radiators 36 are provided which have a coating 37 on the side facing one of the two transport lanes 32, 34. The radiation by the infrared radiators 36 emitted in this direction is at least partially shielded so that the radiation power reaching the preforms 10 in the transport lane 32 is lower than the radiation power reaching the preforms 10 in the transport lane 34. As an alternative to the shielding coating 37 on the infrared radiators 36 themselves, it is also conceivable to position a corresponding shield or a corresponding filter 39 next to the infrared radiators 36, as shown in FIG. 7b. It is also conceivable to combine the concept of FIGS. 6a-c, i.e. the unequal treatment of preforms 10 in the two transport lanes 32, 34 due to a different distance from the infrared radiators 36, with shielding or filtering. For example, as shown in FIG. 7c, it is conceivable to arrange the infrared radiators 36 on the outside of one of the transport lanes 34 and to additionally provide a filter or a shield 39 between the transport lanes 32, 34.

In the context of the invention, a screen or a filter or a coating can also be designed to be frequency-selective. It is known, for example, that PET, a frequently used material in the packaging industry, absorbs long-wave infrared radiation particularly well, while quartz glass retains long-wave frequency components. This results in a more cost-effective, mechanically and thermally robust and easy-to-manufacture filter that does not require any complex surface treatment or coatings.

The embodiments of the invention discussed so far are characterized in that they all have an active cooling or heating effect on the preforms 10. In the context of the invention, however, it is also conceivable to transport the heated preforms 10 from the two transport lanes 32, 34 to the subsequent molding device 3 over different distances, whereby the further transported preforms 10 cool down more in the colder environment than those preforms 10 transported directly to the molding device 3. A corresponding embodiment of the invention is shown in FIG. 8a. There, a section of the container manufacturing machine 1 with the temperature adjustment device 2 is shown, with a compensation device 24 being provided after the heating devices 20, which is assigned exclusively to one of the two heating lanes 32, 34. The compensating device 24 comprises at least 3 transport wheels which lengthen the path for preforms 10 from one of the transport lanes 32, 34 compared to the other transport lane 34, 32. Alternatively, it is also conceivable to position such a compensation device 24, as shown in FIG. 8b, at a later point on the transport path, for example at the transfer station 5 between the temperature adjustment device 2 and the molding device 3. It must be ensured here that only some of the preforms 10 are diverted by means of the compensation device 24, for example by means of a suitable spacing. Only every second preform 10 would have to be diverted by means of the compensating device 24 in FIG. 8b, because the preforms are transferred alternately to the single-row transportation at the end of the double-row transportation with two transport lanes 32, 34.

REFERENCES

1 Container manufacturing machine
2 Temperature adjustment device
3 Molding device
4 Input station
5 Transfer station
10 Preform
12 Container
20 Heating device
22, 22' Active compensation device
23 Active compensation device
24 Passive compensation device
30 Reflector
32, 34 Transport lane
36 Infrared heater
37 Coating
38 Transport mandrel
39 Filter disc
40 Flow channel
42 Fan
44 Perforated sheet
46 Exhaust vent
48 Partition wall
50 Compressed air supply
52 Valve
54 Nozzle arrangement

The invention claimed is:

1. A temperature adjustment device for thermally conditioning preforms made of a thermoplastic material for subsequent molding into containers, the temperature adjustment device comprising:

a transport device for transporting the preforms along a transport path, said transport device including at least one section provided with two adjacent transport lanes through which the preforms are transported in two adjacent rows;

a plurality of heating elements arranged between the two adjacent transport lanes, said plurality of heating elements being arranged to heat the preforms transported through both of the two adjacent transport lanes;

at least one compensation device for compensating for temperature differences between the preforms heated in the two adjacent transport lanes, said at least one compensation device exclusively or more strongly acting to adjust the temperature of preforms heated in one of the two adjacent transport lanes.

2. The temperature adjustment device according to claim 1, wherein the at least one compensation device is adjustable and/or controllable and/or closed loop controllable in its temperature adjustment performance.

3. The temperature adjustment device according to claim 1, wherein the at least one compensation device comprises supply means for a cooling agent for cooling the preforms heated in one of the two adjacent transport lanes, the supply means having a flow path with at least one outlet for the cooling agent facing the preforms heated in one of the two adjacent transport lanes.

4. The temperature adjustment device according to claim 3, wherein the at least one outlet is arranged next to one of the two adjacent transport lanes.

5. The temperature adjustment device according to claim 4, wherein the at least compensation device has a separation device in the area of the outlet arranged between the two adjacent transport lanes for shielding the cooling agent from the other of the two adjacent transport lanes.

6. The temperature adjustment device according to claim 3, wherein the supply means comprise a valve in the flow path that is synchronized with the transport device in order to subject each preform transported past the outlet to the cooling agent depending on the respective one of the two adjacent transport lanes in which the preform was heated.

7. The temperature adjustment device according to claim 1, wherein the at least one compensation device comprises a plurality of heating elements.

8. The temperature adjustment device according to claim 7, wherein the plurality of heating elements of the at least one compensation device are arranged at different distances from the preforms in the two adjacent transport lanes.

9. The temperature adjustment device according to claim 7, wherein the plurality of heating elements of the at least one compensation device are at least partially shielded in a direction toward one of the two adjacent transport lanes.

10. The temperature adjustment device according to claim 8, wherein the plurality of heating elements of the at least one compensation device are at least partially shielded by means of a shielding coating and/or by means of a shielding device arranged between the heating elements and one of the two adjacent transport lanes.

11. The temperature adjustment device according to claim 1, wherein the at least one compensation device is another transport device for the preforms heated in one of the two adjacent transport lanes such that the transport path for said preforms is lengthened as compared to the transport path of the preforms heated in the other of the two adjacent transport lanes.

12. The temperature adjustment device according to claim 1, wherein the temperature adjustment device has two compensation devices, wherein one of the two compensation devices exclusively or more strongly acts on preforms heated in one of the two adjacent transport lanes for adjusting their temperature, and wherein the other one of the two compensation devices exclusively or more strongly acts on preforms heated in the other one of the two adjacent transport lanes.

13. The temperature adjustment device according to claim 12, wherein the two compensation devices are adjustable individually in their temperature adjustment performance.

14. A machine for manufacturing containers from thermally conditioned preforms, the machine comprising:
a temperature adjustment device according to claim 1; and
a molding device for molding the thermally conditioned preforms into the containers.

15. The machine according to claim 14, wherein the molding device is a blow molding device for molding by means of a pressurized gas.

16. The machine according to claim 14, wherein the molding device is a mold filling device for molding by means of a liquid filling substance that remains in the containers.

* * * * *